April 29, 1941.  H. C. LESLIE  2,240,220
WATER CLOSET SEAT
Filed Sept. 9, 1938    3 Sheets-Sheet 1

Inventor
Howard C. Leslie
by Roberts, Cushman & Woodbury
Attys.

April 29, 1941.  H. C. LESLIE  2,240,220
WATER CLOSET SEAT
Filed Sept. 9, 1938  3 Sheets-Sheet 2
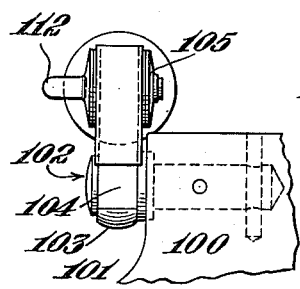
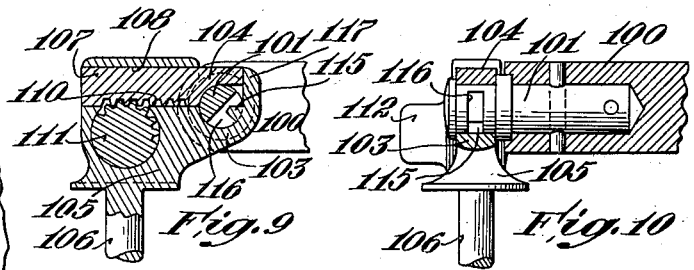
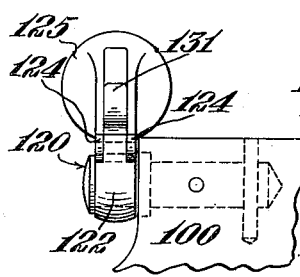
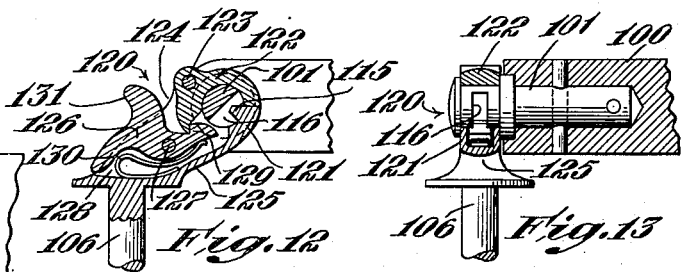
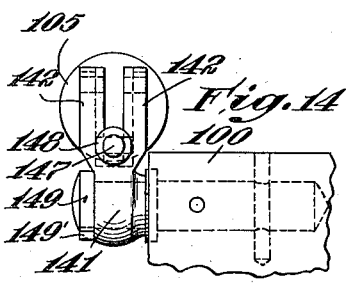
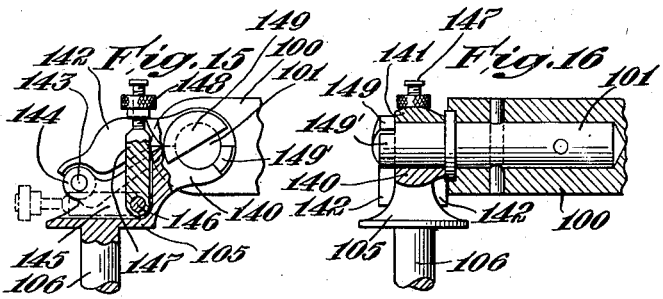
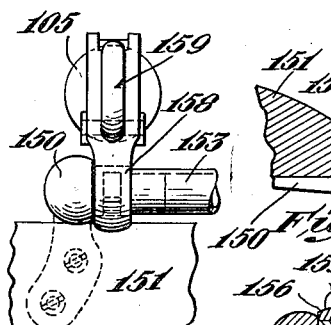
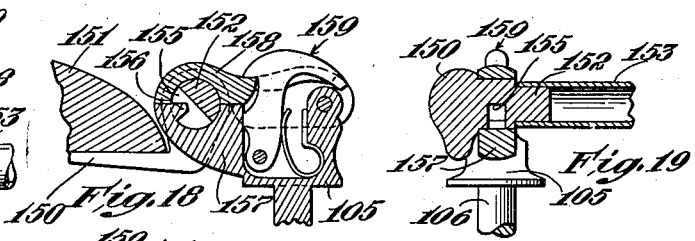
Inventor
Howard C. Leslie
by Roberts, Cushman & Woodberry
attys.

April 29, 1941.   H. C. LESLIE   2,240,220
WATER CLOSET SEAT
Filed Sept. 9, 1938   3 Sheets-Sheet 3

Inventor
Howard C. Leslie
by Roberts, Cushman & Woodbury
attys.

Patented Apr. 29, 1941

2,240,220

UNITED STATES PATENT OFFICE 2,240,220

WATER CLOSET SEAT

Howard C. Leslie, Milton, Mass., assignor to B R E Manufacturing Co., Hyde Park, Mass., a corporation of Massachusetts Application September 9, 1938, Serial No. 229,077

13 Claims. (Cl. 4—236)

This invention relates to an improvement in water closet seats and more particularly to water closet seats, with or without covers, which are detachable from the bowl, tank, wall or other supporting structure.

Heretofore it has been the general practice to mount water closet seats in such manner that they can only be removed after considerable effort, even by a plumber or other mechanic. Usually such removal involves the dismembering and sometimes the destruction of the mountings on which the seat is pivotally supported.

The primary object of this invention is to provide a readily detachable water closet seat and more specifically to provide mountings constructed so as to facilitate the removal of a seat, with or without a cover, so that it can be quickly removed and replaced when desired.

Another object is to provide mountings which may be applied not only to bowls, tanks or other supports of conventional design or construction, but also to various types of seats, with or without covers.

Further objects relate to various features of construction and will be apparent from a consideration of the following description and the accompanying drawings, wherein Fig. 1 is a plan view of the hinge portion of a water closet seat illustrating one embodiment of this invention;

Figs. 8, 9 and 10 are views in plan, transverse section and longitudinal section respectively, of another embodiment of the invention;

Figure 21:
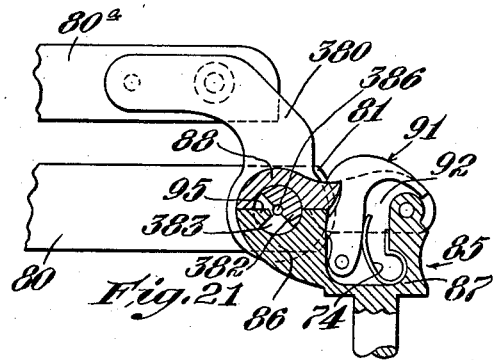
Figure 22:
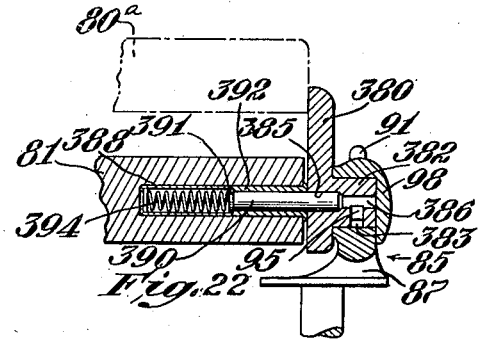
Figure 23:
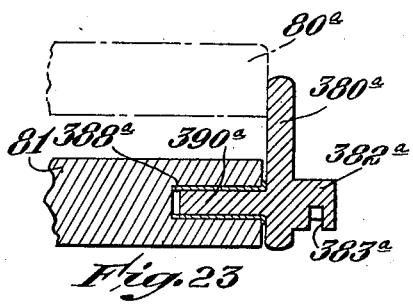
Figure 24:
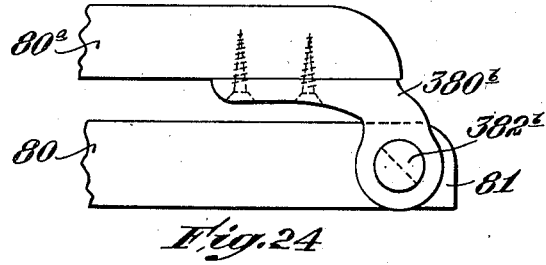
Figure 25:
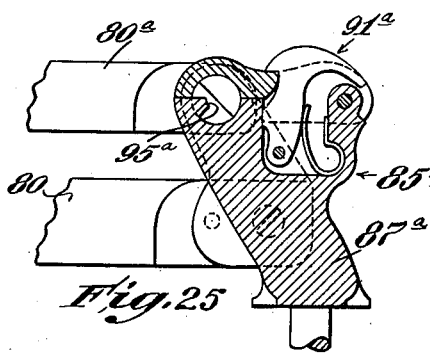
Figure 26:
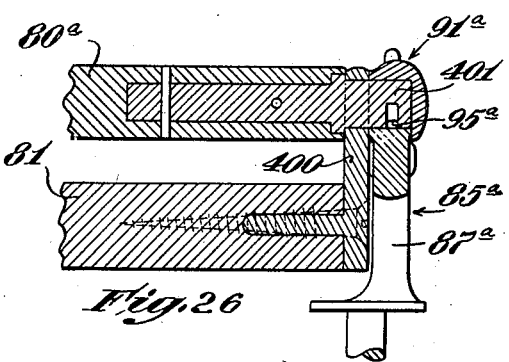
Figure 27:
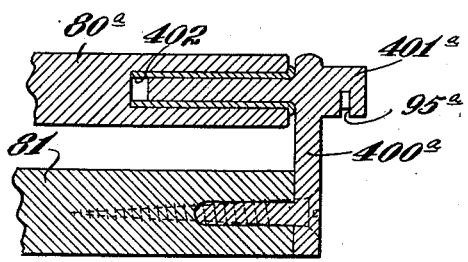

Figs. 11, 12 and 13; 14, 15 and 16; and 17, 18 and 19, respectively, are views similar to Figs. 8, 9 and 10 of other embodiments of the invention;

Fig. 20 is a view similar to Fig. 19 of a water closet seat differing therefrom in that the seat is provided with a cover;

Figs. 21 and 22 illustrate other embodiments of the invention;

Fig. 23 is a section illustrating a seat and cover having a seat trunnion integral with the side arm ear;

Fig. 24 is a side elevation of an arrangement similar to Fig. 23, but showing the side arm ears attached to the bottom of the cover;

Figs. 25 and 26 are sectional views of a seat and cover, the seat being supported on the cover axis; and Fig. 27 is a view similar to Fig. 26, but showing the cover trunnion integral with the side arm ear.

In accordance with the present invention a water closet seat, with or without a cover, is detachably mounted on the bowl, tank, wall or other suitable support by means of mountings comprising relatively separable interengageable bearing and trunnion members which, as herein illustrated, may include split bearings separable so as to permit the removal and replacement of a seat and/or cover carrying a fixed trunnion member,—or an open or slotted bearing associated with means for holding the trunnion member in operative relation thereto, or a collapsible, retractable or removable trunnion in association with a relatively fixed bearing member; and in each case there may be provided a suitable check for the seat and/or cover.

A readily detachable toilet seat constructed in accordance with the present invention is of great advantage for sanitary reasons, since thereby the seat can be replaced whenever necessary. In hospitals, sanitariums and other institutions where health and santitation are of particular consideration the use of such readily detachable seats is of great value. Moreover, in hotels, inns, trains and boats, for example, where the suites or other accommodations include private toilets or baths, this invention permits the easy provision of a freshly sanitized toilet seat each time the occupants of the suite or other accommodations change. The water closet seat may be and preferably is enclosed in a suitable wrapper after having been cleaned and sterilized, to indicate its sanitary condition, as illustrated in my copending application Serial No. 209,406, filed May 23, 1938, now United States Patent No. 2,200,394, granted May 14, 1940.

A further advantage of a detachable seat embodying this invention is that it can without difficulty be substituted for the usual type of water closet seat, since in the conventional constructions the seat is supported upon posts carried by a pottery bowl, tank, wall or the like and is preferably pivoted upon a bar carried at each end by the posts. Moreover, in a seat embodying mounting constructed in accordance with the present invention, the seat posts may be readily removed without injury, simply by holding the attaching nut underneath and turning the top of the post.

Figure 1:
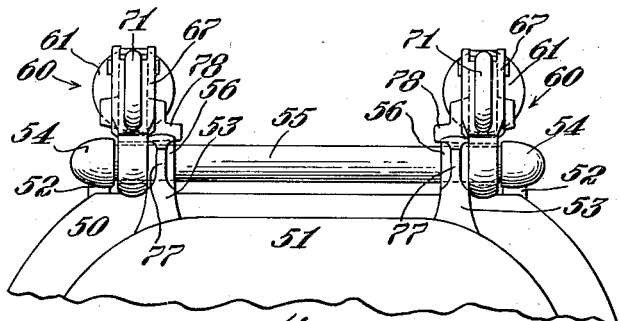
Figure 2:
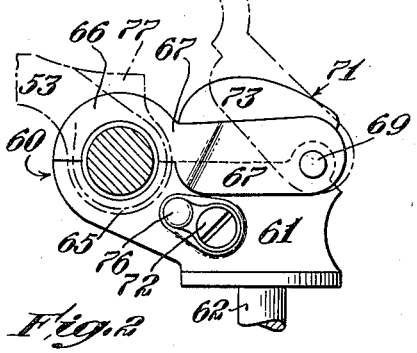
Fig. 2 is an enlarged side elevation of one of the posts to which the seat is attached.
Figure 3:
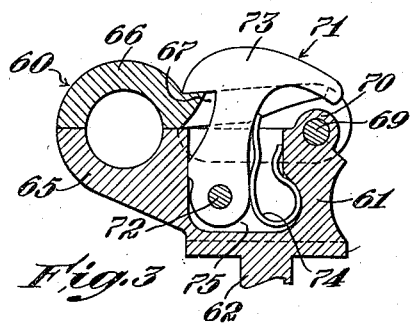
Fig. 3 is an enlarged view in longitudinal section of such post.

Referring to the drawings,—in Figs. 1 to 3 I have illustrated a mounting which comprises a split bearing having a trigger latch, the mounting supporting a seat and cover having a square moulded back and bar hinge, an outside check being provided for the cover. In this embodiment the seat 50 and cover 51 (see Fig. 1) are provided with flaps 52 and 53, respectively, the flaps 52 of the seat terminating in cup-like heads 54 which enclose the ends of the bar 55, although not fixed thereto. The flaps 53 terminate in loops 56 which surround the bar 55 and which are keyed, pinned or otherwise fixed thereto. The bar 55 is rotatably supported in mountings 60. As shown in Fig. 2, each mounting 60 engages the bar between a head 54 and a loop 56 and includes a post 61 secured to the base, tank, hopper or wall by an integral stud 62.

Each mounting also includes a separable bearing in which the bar 55 is rotatably supported, the lower portion 65 being integral with or fixed to the post 61 and the upper portion 66 being pivotally secured thereto. As shown in Figs. 2 and 3, each upper portion 66 is integral with a pair of parallel arms 67 extending at opposite sides of the post 61 and pivotally secured thereto by a pin 69 passed through a stud 70 at the top of the post 61. The bearing is held closed by a latch 71 pivoted to the post 61 by a pin 72 and having a head 73 which, when advanced, extends over the rear edge of the portion 66, and when retracted, is between the arms 67 and permits the raising of the portion 66. A spring 74 normally holds the latch in the operative position. The post 61 is provided with a recess 75 open at the top in which the latch 71 and spring 74 are positioned (see Fig. 3). Projecting from each post 61 is a boss 76 which is engaged by a tongue 77 on a flap 53 to limit the backward pivotal movement of the cover 51.

Figures 4, 6:
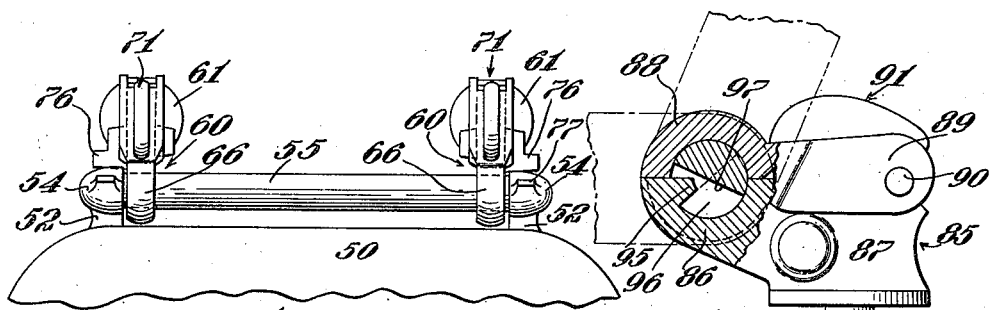
Fig. 4 is a plan view similar to Fig. 1 of another embodiment of the invention.
Fig. 6 is an enlarged view, partly in section, of one of the posts shown in Fig. 5.

The embodiment shown in Fig. 4 illustrates a split bearing having a trigger latch, in association with a seatless cover, which is formed with a square moulded back and provided with a bar hinge and outside check. This embodiment differs from that shown in Figs. 1, 2 and 3 in that the water closet seat 50 has no cover and the seat flaps 52 are fixed to the ends of the bar 55 so that the seat and bar move simultaneously. The mountings 60 are identical to those described above except that the bosses 76 are on the opposite sides of the posts 61 so that they are engaged by tongues 77 on the flaps 52. The same reference characters have been applied to the elements in Fig. 4 as to those in Figs. 1, 2 and 3 and any detailed description thereof is omitted as unnecessary.

Figure 5:
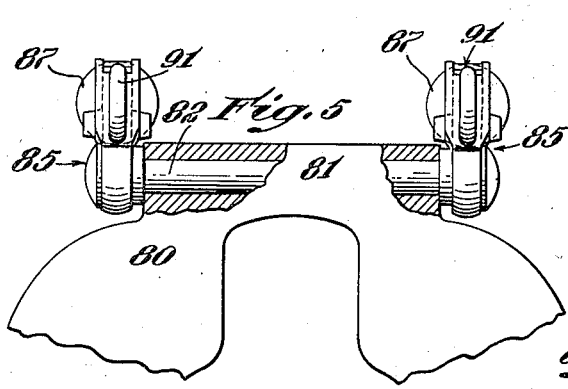
Fig. 5 is a plan view, with parts broken away, of another embodiment of the invention.
Figure 7:
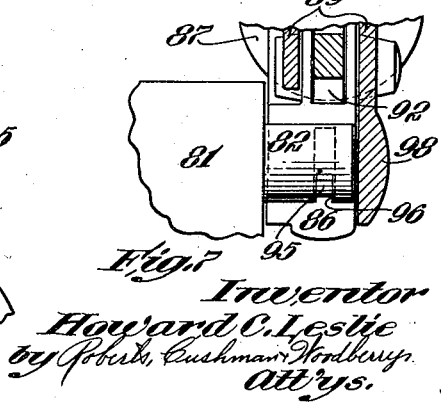
Fig. 7 is an enlarged plan view, with parts broken away, of the post and a portion of the seat shown in Fig. 6.

Figs. 5, 6 and 7 illustrate a split bearing trigger latch arrangement applied to a seatless cover, which is formed with an extended back and provided with an inside concealed check. In this embodiment the seat 80 has a rearwardly extending projection 81 through which is passed a bar 82. The bar 82 is fixed in any suitable manner to the seat for movement therewith. The ends of the bar 82 are supported by mountings 85 which in general correspond to the mountings 60, each having a bearing comprising a stationary lower portion 86 fixed to a post 87 and an upper portion 88 at the ends of a pair of parallel arms 89 pivoted by a pin 90 to the post 87. A latch 91 similar to the latch 71 and mounted in a recess 92 in the post holds the bearing members closed as shown in Fig. 6. The raising of the seat 80 is limited by a finger 95 which is integral with the lower portion 86 of the bearing and projects inwardly therefrom. A slot 96 is formed in each end of the bar 82 to receive the fingers 95. As shown in Fig. 6 by full and dotted lines when the seat is raised the finger 95 contacts with the base 97 of the bar and limits its further movement. Since the finger is integral with the lower portion 86 and the post 87, the strain is directly exerted thereon. Moreover, the bearings are offset from the axial line of the post and the fingers 95 coact with the walls of the slots 96 in the bar to keep the bearings the proper distance apart and prevent shifting thereof. The open outer ends of the bearings are closed by caps 98 formed at the outer ends of the outer arms 89. While a single bar 82 is here shown, it is obvious that it might be replaced by two shorter bars projecting from the sides of the projection 81 and the term "bar" as used in the claims is considered to be of sufficient breadth to cover such replacement.

Figs. 8, 9 and 10 disclose an embodiment of this invention which comprises an open bearing having a rack and pinion cover slide, in association with an extended back seatless cover, provided with an inside concealed check. Carried by the seat 100 is a bar 101 (here shown as in two parts) projecting from the sides of the seat and received within the bearings of the mountings 102. Each bearing comprises a stationary lower portion 103 and a movable upper portion 104. The portion 103 is integral with the post 105 of the mounting which is secured to the base, hopper, tank or wall of the water closet by stud 106. The upper portion 104 of the bearing is formed integral with a bar 107 reciprocal in a channel 108 formed in the post 105. The bar 107 is reciprocable in the channel in any suitable way to advance or retract the portion 104. As here shown, rack and pinion mechanism is provided, the rack 110 in the lower side of the bar meshing with the teeth of a pinion 111 rotatable in the post and operable by an outwardly projecting thumb piece 112. The lower portion 103 is provided with a finger 115 which like the finger 95 enters a slot 116 in the bar 101 and serves both to limit the raising of the seat and also to keep the offset bearings in alignment. The lower portion 103 is provided at its forward end with an upwardly projecting finger 117 against which the forward end of the upper portion 104 rests when the bearing is closed.

The embodiment in Figs. 11, 12 and 13 illustrates a self-closing and locking mounting for an extended back seatless cover, provided with an inside concealed check. Those elements which correspond to those shown in Figs. 8, 9 and 10 will be designated by the same reference numbers and will not be described in detail. The mountings 120 which receive the ends of the bar 101 comprise a stationary lower portion 121 and a movable upper portion 122 pivotally mounted by a pin 123 carried by ears 124 on the post 125. The bearing is held closed by a latch 126 pivotally mounted on a pin 127 in a recess 128 in the post 125 and provided with a nose 129, which, as shown in Fig. 12, engages the lower rear edge of the portion 122 to close the bearing. A spring plate 130 normally holds the latch in the operative position. A thumb piece 131 is provided for the actuation of the latch 126. The application of pressure upon the thumb piece 131 will rock the latch to release the upper portion 122 of the bearing so that it will be raised by lifting the bar 109 to release the seat.

Figs. 14, 15 and 16 illustrate a mounting comprising a split bearing provided with a swinging arm latch, in association with an extended back seatless cover, provided with an outside concealed check. In this embodiment the bearing upon the post 105 comprises a fixed lower portion 140 and a movable upper portion 141 including a pair of rearwardly extending parallel arms 142 pivotally fixed to the post 105 by a pair of pins 143 carried by ears 144. Below and in register with the space between the arms 142 is formed a pocket 145 in the post 105. Pivoted in the pocket 145 on a pin 146 is a locking rod 147, the other end of which extends beyond the top of the arms 142 and is threaded to receive a nut 148. The bearing is locked closed when the rod 147 is raised and the nut 148 turned down, as shown in full lines in Fig. 15. By backing off the nut 148 the rod 147 may be swung into the dotted line position shown in Fig. 15 and the upper portion 141 is released and may be swung back to release the rod 101 and allow removal of the seat 100. The raising of the seat 100 is limited by the coaction of a plate 149 on the end of the bar 100 and a stud 149' on the lower portion 140.

Figs. 17, 18 and 19 illustrate the split bearing-trigger latch arrangement as applied to a square moulded back seatless cover, provided with a bar hinge and an inside concealed check. In this embodiment the flop 150, carried by the seat 151, is provided with an integral inwardly extending rod 152 which is supported in the bearing and projects beyond the side thereof. A tube 153 is fixed to the projecting ends of the rods and forms therewith the seat bar. In the rod is provided a slot 155 which receives the limit finger 156 projecting inwardly from the fixed lower portion 157. The movable upper portion 158 is held to the portion 157 by a latch 159, which is shown similar in construction to the latch 91 and need not be described in detail. It is to be understood that in this embodiment the use of the tube 153 is optional and, if desired, may be eliminated since the concealed stop finger 156 is not only effective to hold the parts properly positioned, but also to receive all the strain within itself.

When the mounting shown in Figs. 17, 18 and 19 is employed in a seat and cover installation, the construction shown in Fig. 20 may be employed. The rod 160 is integral with the cover flap 161 and the seat flap 162 terminates in a head 163 which receives the end of the rod. As indicated by the reference numerals, the mounting is in other respects the same as that shown in Figs. 17, 18 and 19.

In Figs. 21 and 22 I have shown a split bearing-trigger latch arrangement having a concealed inside check and associated with an extended back seat and cover, the seat being demountable and carrying a collapsible seat trunnion. In this embodiment the split bearing-trigger latch arrangement is substantially identical to that shown in Figs. 5 to 7 and the same reference characters are applied to corresponding parts. In place of the bar hinge of the embodiment shown in Figs. 5 to 7 there is provided a side arm ear 380 formed with a post trunnion 382 having a slot 383 to accommodate the stop finger 95. The lower end of the side arm ear 380 is formed with an opening 385 which communicates with a smaller opening 386 formed in the post trunnion 382. The extended back 81 of the seat 80 is provided with a transverse bore to receive a sleeve 388 which slidably supports a seat trunnion 390, the outer end of which is received in the opening 385, as shown in Fig. 22. The inner end of the trunnion 390 is formed with an enlarged head 391 engageable with an annular shoulder 392 formed on the inner surface of the sleeve 389 to limit the outward movement of the trunnion under the influence of a compression spring 394 disposed at the inner end of the sleeve.

The upper end of the side arm ear 380 is rigidly secured to the lateral edges of the cover 80ª by suitable fastening elements carried by the ears 380. With this construction the seat and cover may be removed as a unit from their mountings and by inserting the end of a nail or like instrument through the opening 386 and pressing against the trunnion 390, the latter may be collapsed so that the seat 80 may be removed from the seat and cover unit. It will be noted that with this construction the seat 80 may be removed without detaching the cover and associated parts, merely by releasing the cap 98 so as to provide access to the opening 386.

In Fig. 23 I have shown a seat and cover arrangement similar to that shown in Figs. 21 and 22, except that the seat is not demountable. In this embodiment the construction of the side arm ear 380ª is substantially the same as in the above-described embodiment except that the openings 385 and 386 are eliminated and there is provided at the lower end of the ear an integral seat trunnion 390ª rotatably mounted in a sleeve 388ª disposed in a transversely extending bore formed in the extended back 81 of the seat 80. With this construction the seat and cover are removable and replaceable as a unit, although the seat cannot be detached from the cover assembly as in the above-described embodiment.

Fig. 24 illustrates a seat and cover assembly wherein the side arm ears 380ᵇ are attached to the bottom of the cover by screws or the like fastening elements, this arrangement being suitable for use with either the construction shown in Figs. 21 and 22, or that shown in Fig. 23.

In Figs. 24 and 25 I have illustrated the split bearing-trigger latch arrangement in combination with a seat and cover unit, the seat being pivoted on the cover axis. In this embodiment the general construction of the split bearing-trigger latch arrangement, including the inside concealed check feature, is similar in all material particulars to the arrangement shown in Figs. 5 to 7 and 21 and 22, except that the post 87ª extends upwardy from its support or base to the level of the cover. The extended back 81 of the seat 80 is rigidly secured to a side arm ear 400 having at its upper end an opening through which the cover trunnion 401 extends, the side arm ear 400 supporting the seat for pivotal movement about the cover axis. The inner end of the cover trunnion 401 is suitably anchored within the body of the cover, as shown in Fig. 26, and its outer end is formed with a slot 95ª so as to fit the mounting 85ª.

This construction provides a detachable seat and cover unit and it will be noted that the finger stop 95ª provides a check for the cover 80ª and that the cover, in turn, serves as a check for the seat 80.

The embodiment shown in Fig. 27 is similar to that shown in Figs. 25 and 26, except that the side arm ear 400ᵃ is formed integral with the cover trunnion 401ᵃ and the inner end of the cover trunnion is rotatably mounted in a sleeve 402 fixed within an opening formed in the cover. With this construction and arrangement the cover 80ᵃ is pivotally supported by the inner end of the trunnion 401ᵃ and the seat is pivotally supported by the side arm ears 400ᵃ so as to swing about the cover axis, it being noted that the stop elements provide a check for the seat rather than for the cover, as in the embodiment shown in Figs. 25 and 26.

While I have shown and described several desirable embodiments of the invention, it is to be understood that the present disclosure is for the purpose of illustration and that various changes in shape, proportion, and arrangement of parts, as well as the substitution of equivalent elements for those herein shown and described, may be made without departing from the spirit and scope of the invention as set forth in the appended claims.

I claim:

1. A sanitary seat for a water closet having stationary posts to which the seat is removably secured by a seat bar and means for connecting said bar to the seat, and means for connecting said bar to said posts, such last-named means including a separable bearing carried by a post in which said seat bar is supported, the bearing being formed by a stationary portion and a movable portion, said last-named portion being supported by said post and movable relative to said post and said stationary portion.

2. A sanitary seat for a water closet having stationary posts to which the seat is removably secured by a seat bar and means for connecting said bar to the seat, and means for connecting said bar to said posts, such last-named means including a separable bearing carried by a post in which said seat bar is supported, the bearing being formed by a stationary portion and a movable portion, said last-named portion being supported by said post and movable relative to said post and said stationary portion, and means for holding said movable portion against such movement.

3. A sanitary seat for a water closet having stationary posts to which the seat is removably secured by a seat bar and means for connecting said bar to the seat, and means for connecting said bar to said posts, such last-named means including a separable bearing carried by a post in which said seat bar is supported, the bearing being formed by a stationary lower portion on the post on which said bar rests, and an upper portion supported by said post and movable relative thereto and to said stationary lower portion.

4. A sanitary seat for a water closet having stationary posts to which the seat is removably secured by a seat bar and means for connecting said bar to the seat, and means for connecting said bar to said posts, said last-named means including a separable bearing carried by a post in which said seat bar is supported, the bearing being formed by a stationary lower portion on the post on which said bar rests, and an upper portion supported by said post and movable relative thereto and to said stationary lower portion, and means carried by said post for holding said upper portion against such movement.

5. A sanitary seat for a water closet having stationary posts to which the seat is removably secured by a seat bar and means for connecting said bar to the seat, and means for connecting said bar to said posts, such last-named means including a separable bearing carried by a post in which said seat bar is supported, the bearing being formed by a stationary lower portion on the post on which said bar rests, and an upper portion pivotally secured to said post and movable relative thereto and to said stationary lower portion.

6. A sanitary seat for a water closet having stationary posts to which the seat is removably secured by a seat bar and means for connecting said bar to the seat, and means for connecting said bar to said posts, said last-named means including a separable bearing carried by a post in which said seat bar is supported, the bearing being formed by a stationary lower portion on the post on which said bar rests, and an upper portion pivotally secured to said post and movable relative thereto and to said stationary lower portion, and a latch carried by said post for holding the upper portion against said lower portion to complete the bearing.

7. A sanitary seat for a water closet having stationary posts to which the seat is removably secured to said closet, mountings by means of which the seat is pivotally supported by said posts, each of said mountings comprising relatively separable bearing and trunnion members, one of said members being carried by the post and the other of said members being associated with said seat, and check means associated with one of said members for holding said seat in upright position relative to the closet bowl, and for preventing swinging of the post about its axis relative to said trunnion member.

8. A sanitary seat for a water closet having stationary posts to which the seat is removably secured, mountings by means of which the seat is pivotally supported by said posts, relatively separable bearing members carried by each post, a trunnion secured to said seat and rotatably supported by said bearing members, and check means for holding said seat in upright position relative to the closet bowl, said check means comprising interengaging parts, one of which is carried by one of said bearing members and the other by said trunnion, said interengaging parts cooperating to prevent swinging of the post about its axis relative to said trunnion member.

9. A sanitary seat for a water closet having stationary posts to which the seat is removably secured, mountings by means of which the seat is pivotally supported by said posts, relatively separable bearing members, one of which is fixed to a post and the other is supported so as to move toward and away from the fixed member, releasable means for holding said bearing members in closed position, a trunnion secured to said seat and rotatably supported by said bearing members, and check means for holding said seat in upright position relative to the closet bowl, said check means comprising interengaging parts, one of which is carried by one of said bearing members and the other by said trunnion, said interengaging parts cooperating to prevent swinging of the post about its axis relative to said trunnion member.

10. A sanitary seat for a water closet having stationary posts to which the seat is removably secured, mountings by means of which the seat is pivotally supported by said posts, split bearing members, one of which is fixed to a post and the other pivotally mounted on said post, a trunnion secured to said seat and rotatably supported by said bearing members, and check means for holding said seat in upright position relative to the closet bowl, said check means comprising interengaging parts, one of which is carried by one of said bearing members and the other by said trunnion, said interengaging parts cooperating to prevent swinging of the post about its axis relative to said trunnion member.

11. A sanitary seat for a water closet having stationary posts to which the seat is removably secured, mountings by means of which the seat is pivotally supported by said posts, relatively separable bearing members carried by a post, a trunnion secured to said seat and rotatably supported by said bearing members, and check means for holding said seat in upright position relative to the closet bowl, said check means comprising an outstanding finger formed on one of said bearing member and an abutment formed by a recessed portion in said trunnion, said finger and recessed portion cooperating to prevent swinging of the post about its axis relative to said trunnion member.

12. A sanitary seat for a water closet having stationary posts to which the seat is removably secured, mountings by means of which the seat is pivotally supported by said posts, the upper end of a post being formed with a recess and a generally semi-cylindrical member constituting one part of a split bearing, an arm pivotally secured to said post, the free end of said arm being formed with a generally semi-cylindrical member constituting another part of said split bearing, a latch mounted in said recess and operative releasably to hold said arm in position to maintain the split bearing members in operative relation, and a trunnion secured to said seat and rotatably supported by said bearing members.

13. A sanitary seat for a water closet having stationary posts to which the seat is removably secured, mountings by means of which the seat is pivotally supported by said posts, the upper end of a post being formed with a recess and a generally semi-cylindrical member constituting one part of a split bearing, an arm pivotally secured to said post, the free end of said arm being formed with a generally semi-cylindrical member constituting another part of said split bearing, a spring-pressed latch pivotally mounted in said recess and operative releasably to hold said arm in position to maintain the split bearing members in operative relation, and a trunnion secured to said seat and rotatably supported by said bearing members.

HOWARD C. LESLIE.